United States Patent [19]

Lewis et al.

[11] Patent Number: 4,982,156

[45] Date of Patent: Jan. 1, 1991

[54] POSITION TRANSDUCER APPARATUS AND ASSOCIATED CIRCUITRY INCLUDING PULSE ENERGIZED PRIMARY WINDING AND PAIR OF WAVEFORM SAMPLED SECONDARY WINDINGS

[75] Inventors: Leon Lewis, Rancho Palos Verdes; Bryan White, Manhattan Beach; Clarence Yamanaka, Torrance, all of Calif.

[73] Assignee: Allied-Signal Inc., Morris Township, Morris County, N.J.

[21] Appl. No.: 240,176

[22] Filed: Sep. 2, 1988

[51] Int. Cl.⁵ .................. G01B 7/14; G01B 7/30; C08C 19/08; H01F 21/06
[52] U.S. Cl. .................. 324/207.18; 340/870.36
[58] Field of Search ............. 324/207, 208, 233, 329; 340/870.31, 870.35, 870.36; 318/656-661

[56] References Cited

U.S. PATENT DOCUMENTS

| | | |
|---|---|---|
| 2,419,612 | 4/1947 | Warshaw . |
| 2,499,665 | 3/1950 | Mestas . |
| 3,110,850 | 11/1963 | Young, Jr. . |
| 3,555,405 | 9/1967 | Martin . |
| 3,573,494 | 4/1968 | Houpt et al. . |
| 3,600,669 | 8/1971 | McClain . |
| 3,684,961 | 8/1972 | Muir ........................... 340/870.35 X |
| 3,714,567 | 1/1973 | Kusters et al. . |
| 3,892,043 | 7/1975 | Bonikowski . |
| 3,944,903 | 3/1976 | Clegg . |
| 4,030,026 | 6/1977 | Payne ................................. 324/329 |
| 4,083,237 | 4/1978 | Levesque . |
| 4,107,603 | 8/1978 | Slough . |
| 4,200,827 | 4/1980 | Oswald . |
| 4,207,504 | 6/1980 | Kawada et al. . |
| 4,350,441 | 9/1982 | Wicnienski . |
| 4,423,365 | 12/1983 | Turner . |
| 4,450,443 | 5/1984 | Dolland . |
| 4,455,555 | 6/1984 | Symonds et al. . |
| 4,514,689 | 4/1985 | Gerard . |
| 4,591,795 | 5/1986 | McCorkle . |
| 4,651,130 | 3/1987 | Pennell . |
| 4,652,821 | 3/1987 | Kreft ........................ 340/870.31 X |
| 4,857,919 | 8/1989 | Braswell ....................... 324/208 X |

FOREIGN PATENT DOCUMENTS

| | | | |
|---|---|---|---|
| 3608807 | 9/1987 | Fed. Rep. of Germany ...... 324/208 |
| 697800 | 11/1979 | U.S.S.R. ............................. 324/208 |
| 1026262 | 6/1983 | U.S.S.R. ............................. 324/208 |
| 2041532 | 9/1980 | United Kingdom ............... 324/329 |

Primary Examiner—Gerard R. Strecker
Attorney, Agent, or Firm—David B. Abel; Terry L. Miller; Robert A. Walsh

[57] ABSTRACT

This invention relates to transducers for indicating position. In particular, this invention relates to circuitry for accurately measuring either rotary or linear displacement of an inductive coupling member within a voltage displacement transformer (LVDT or RVDT).

20 Claims, 2 Drawing Sheets

POSITION TRANSDUCER APPARATUS AND ASSOCIATED CIRCUITRY INCLUDING PULSE ENERGIZED PRIMARY WINDING AND PAIR OF WAVEFORM SAMPLED SECONDARY WINDINGS

BACKGROUND OF THE INVENTION

This invention relates to an improved linear variable displacement transducer (LVDT) or rotational variable displacement transducer (RVDT) and improved circuitry for the operation thereof.

LVDTs and RVDTs are used to generate an electrical output proportional to the mechanical displacement of a moveable core generally of ferromagnetic material. The electrical output provides an electrical measurement of distances and displacements which in turn may represent, for example: force, torque, pressure, velocity, or acceleration. As such, LVDTs and RVDTs are in common use in a number of well known configurations. The basic elements include a moveable core, a primary coil and a pair of secondary coils which are so arranged as to have the moveable core magnetically link the primary coil with the secondary coils.

The advantages associated with the use of differential transformers over other displacement transducers, such as the resistance potentiometer, are the absence of contacts, infinite resolution, low and near constant output impedance, and input-output isolation. The disadvantage is that operation has heretofore been limited to excitation by conventional alternating voltages, with the accompanying drawbacks of residuals, transients, harmonic generation, and shielding problems.

Two recent patents representative of the state of the art for conventional AC excitation of the primary coil within an LVDT are U.S. Pat. No. 4,514,689 issued to William A. Gerard and U.S. Pat. No. 4,450,443 issued to Charles R. Dolland. The 4,514,689 patent detects the peak value and polarity of each secondary coil output voltage and provides an output voltage representative thereof. The 4,450,443 patent converts the output of the secondary coil from a sinusoidal (AC) waveform to a square-wave signal prior to sampling a value proportional to the peak value of the output waveforms. Both feature high resolution and accuracy, however, both also retain some of the inherent limitations associated with the use of an AC excitation signal.

SUMMARY OF THE INVENTION

The transducer of the present invention utilizes a signal generator to initiate a voltage pulse which is transmitted through one or a plurality of variable displacement transformers, each having a primary coil and a pair of secondary coils magnetically linked by a moveable core, to a plurality of sample and hold elements associated with the secondary coils. Each transformer is arranged such that the degree of flux linkage between the primary and secondary coils is dependent upon the physical position of the core. In a neutral position, the flux linkage will produce an equivalent voltage in the two secondary coils. Movement of the core from the neutral position will cause an uneven linkage in the two secondary coils resulting in different voltages being induced within the secondary coils. These voltages are measured by the pair of sample and hold elements at a predetermined time after the signal generator initiates the voltage pulse. This time delay enables the sample and hold elements to examine a desired segment of the induced pulses generated within the secondary coils, which segment is substantially linear, thereby avoiding sampling of distortions which occur near the beginning and end of the induced pulses. This enables a more accurate measurement with less possibility of error. Signal processing circuitry analyzes the sampled and held voltages to produce a digital output signal indicative of the position of the moveable core.

BRIEF DESCRIPTION OF THE DRAWINGS

Further aspects of the invention will become apparent from the following detailed description taken in conjunction with the accompanying drawings wherein.

DETAILED DESCRIPTION OF THE INVENTION

Figure 1:
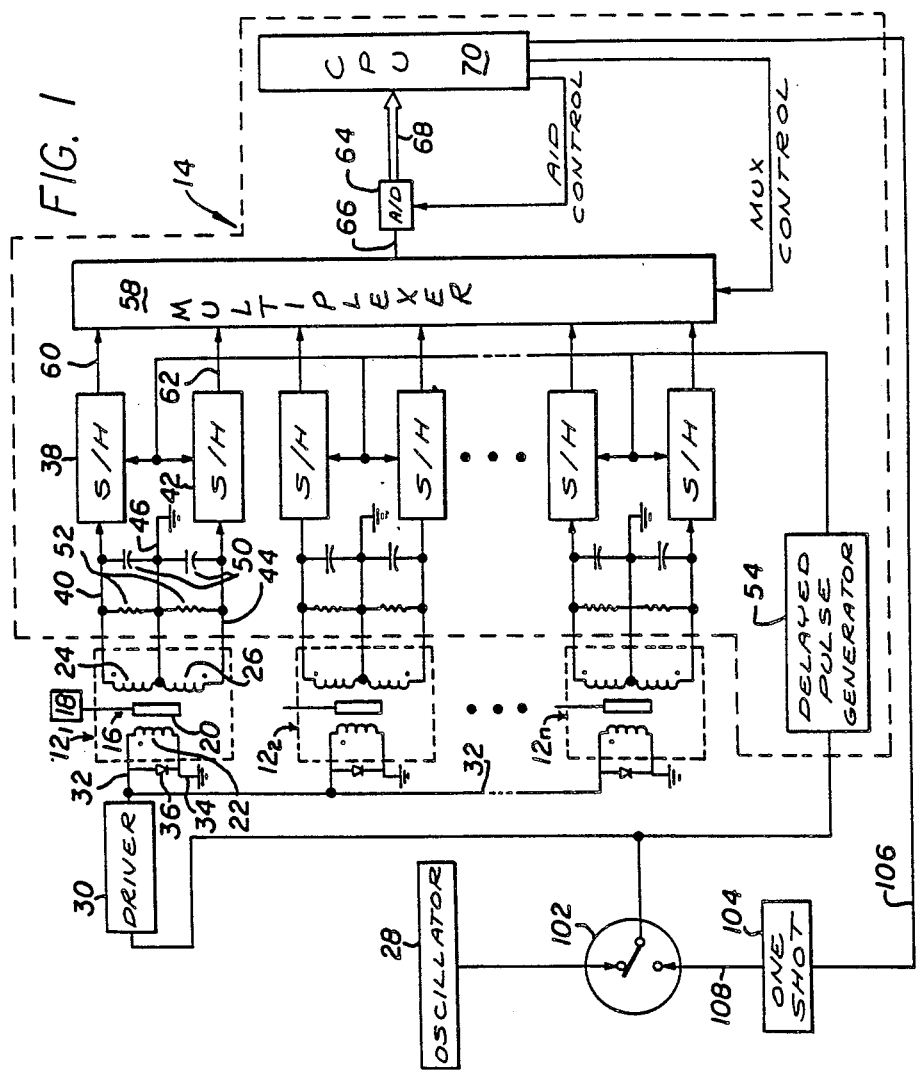
FIG. 1 is a detailed schematic of the circuitry of the present invention including a plurality of linear variable displacement transformers.

FIG. 1 schematically illustrates apparatus in accordance with the present invention having a plurality of linear variable displacement transducers (LVDTs) 12 and associated signal processing circuitry 14. The operation of the circuit will first be described with reference to one LVDT 12. Each LVDT 12 includes a moveable member 16, connected to an external mechanical link 18, member 16 being translatable along the y-axis in response to the external mechanical link 18. The LVDTs 12 also include a magnetic core 20 coupled to the moveable member 16, a primary coil 22, and a pair of secondary coils 24, 26. The primary coil 22 and secondary coils 24, 26 are coaxially positioned and arranged such that the amount of magnetic coupling between the primary coil 22 and each of the two secondary coils 24, 26 is dependent upon the position of the magnetic core 20. A signal generator such as an oscillator 28 and line driver 30, is electrically connected by positive leads 32 to the primary coil 22 of LVDT 12. The oscillator 28, which may include an internal reference clock, excites the primary coil 22 with a voltage pulse, having a preferred repetition rate of between 500 Hz and 4000 Hz. This preferred repetition rate may be increased if required for higher accuracy. The primary coil 22 also has a ground lead 34 and may include clamping diode 36 placed across the primary coil 22 to allow the primary coil 22 to discharge.

The secondary coils 24, 26 are adapted to provide voltages, inductively generated in response to the excitation of the primary coil 22, to signal processing circuitry 14. Accordingly, the secondary coil 24 is electrically connected at its output terminal to a sample and hold element 38 via conductor 40. Similarly, secondary coil 26 is electrically connected at its output terminal to a sample and hold element 42 via conductor 44. The other terminal of secondary coils 24 and 26 is referenced to ground through ground wire 46. The secondary coils 24, 26 also may include capacitors 50 and resistors 52 placed across their terminals to allow discharge thereof (diodes such as those shown across primary coil 22 may also be used). A delayed pulse generator 54 is electrically connected to the oscillator 28 and each of the sample and hold elements 38 and 42 to provide a timing signal to the sample and hold elements 38, 42. The sample and hold elements 38, 42 are also electrically connected to a multiplexer 58 through signal leads 60, 62. The multiplexer 58 is connected to an analog to digital converter 38 via a multiplexer output bus 66. The analog to digital converter 64 is in turn connected via a data bus 68 to a central processing unit (CPU) 70, which is either a computer or simply a programmable microprocessor. The CPU 70 is also electrically connected to the multiplexer 58. The signal processing circuitry 14 includes the sample and hold elements 38, 42, the delayed pulse generator 54, the multiplexer 58, the analog to digital converter 64, the CPU 70, as well as the electrical conductors linking each of these elements.

Figure 2:
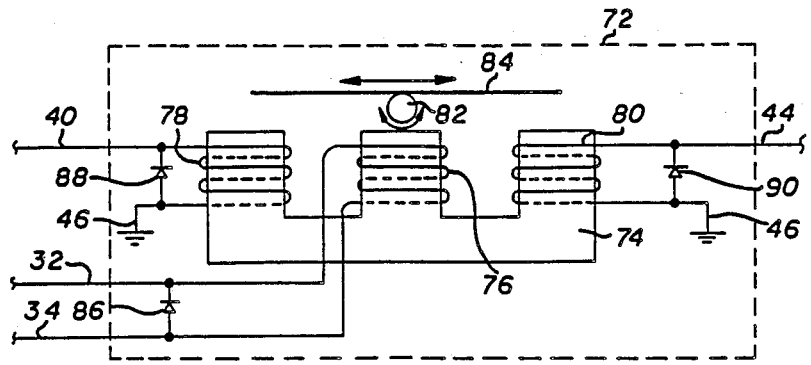
FIG. 2 illustrates a rotational variable displacement transformer arrangement useable in the circuit of FIG. 1.

FIG. 2 represents a rotational variable displacement transducer (RVDT) 72 which may be used to replace the LVDT 12 within the circuitry of FIG. 1. The RVDT 72 includes an E-shaped core 74 having a primary coil 76 encircling the center arm of the E-shaped core 74, and secondary coils 78, 80 encircling opposite arms of the E-shaped coil 74. A rotatable pivot 82 may be mechanically connected to an external mechanical link (not shown). A displacement input member 84, which operates to magnetically link the primary coils 76 and secondary coils 78, 80, is translatable in response to rotation of the rotatable pivot 82, thereby providing variable magnetic linking of the RVDT 72 in response to the external mechanical link. The RVDT 72 may also include clamping diodes 86, 88 and 90 across the primary coil 76 and the secondary coils 78 and 80 respectively.

Generally, when the primary coil 22 of the LVDT 12 in FIG. 1 is energized with a positive square-wave pulse, positive voltages are induced within the secondary coils 24, 26. The magnetic core 20 provides a path for the magnetic flux linking the primary coil 22 and secondary coils 24, 26. When the magnetic core 20 is moved from the center position, the induced positive voltage in the secondary coil toward which the magnetic core 20 is moved increases, while the induced positive voltage in the other secondary coil decreases. Thus, the secondary coils 24, 26 produce a positive voltage of varying magnitude in response to the energizing of the primary coil 22. The sample and hold elements 38, 42 receive the positive voltage ouputs from the secondary coils 24, 26. The sample and hold elements 38, 42 wait for a signal from the delayed pulse generator 54, timed to allow the initial transients of the received voltage outputs to dissipate, then the sample and hold elements 38, 42 sample the voltage output and hold the sampled values. The sampled voltage values are communicated from the sample and hold elements 38, 42 to the multiplexer 58 which subsequently transfers the sampled voltage values to the analog to digital converter 64. Within the analog to digital converter 64, the analog sampled voltage values are converted to a pair of digital numbers A and B, A representing a digital value for the output of each secondary coil 24 and B representing a digital value for the output of secondary coil 26. These digital values, A and B, are then sent to the CPU 70.

The CPU 70 uses the values A and B to perform a calculation which determines the position of the moveable member 16 within the LVDT 12, and thus also indicate the position of the external mechanical link 18. The position value (P) to be calculated by the CPU is determined by the equation:

$$P = (A - B)/(A + B)$$

It is readily observable that when the magnetic core 20 is in its center position intermediate to secondary coils 24, 26, the values of A and B will be equivalent, therefor P=0. When the value of A is high with respect to B, the quantity calculated for P would approach a positive 1. If the value of B is high with respect to A, the quantity calculated for P would approach a negative 1. Thus, the relative position of the member 16 can be determined by a value for P within the range −1 to +1 representing the limits on the displacement of the magnetic core 20. Since the values of A and B used to calculate P are digital numbers, the value of P will be easily determined and highly accurate. By the use of this circuitry, the incorporation of the position of the member 16 into external analysis and control programming means will be facilitated.

Figure 3:
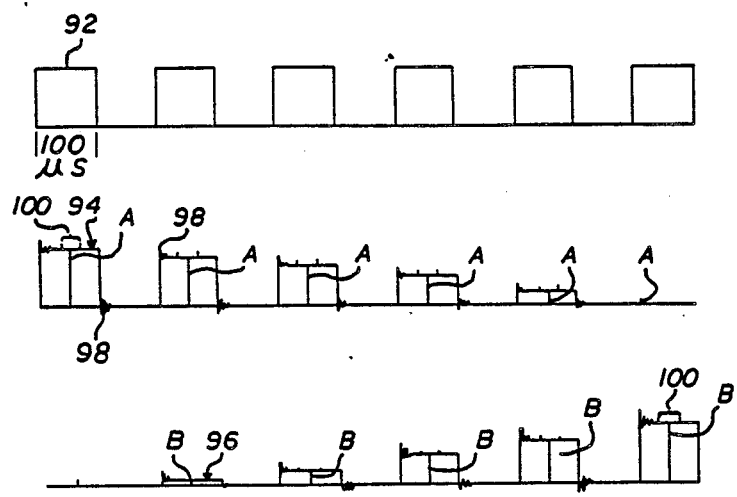
FIG. 3 is a graphic representation of the operation of the apparatus of FIG. 1.
Figure 3:
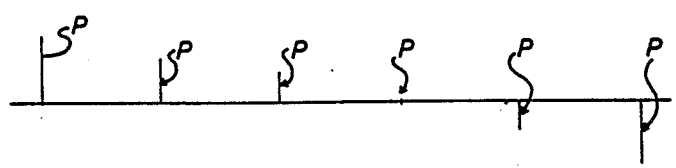

The operation of the apparatus of FIGS. 1 and 2 is more clearly described with reference to FIG. 3 which illustrates various quantities as a function of time. FIG. 3 shows the voltage waveforms across elements indicated by the corresponding reference numerals in FIG. 1. The various waveforms and output signals are arranged so that vertically aligned values occur simultaneously. The output of the signal generator i.e., oscillator 28 and driver 30 is illustrated as a unipolar square-wave pulse 92. The output of secondary coils 24 and 26 are represented by output voltage waveforms 94 and 96 respectively. The well known overshoot and transients 98 which are associated with a transformer responding to an energizing signal exist at the beginning and end of each output voltage waveform 94 and 96. The center of the output voltage waveforms 94, 96, however, are substantially linear. The sample and hold elements 38 and 42 are caused to sample the output voltage waveforms 94, 96 of secondary coils 24, 26 within a window 100 centered about halfway into the waveform, the samples taken therein are free of the transient distortions 98. The width of the window 100 within which acceptable samples can be taken may be adjusted depending upon the voltage and current characteristics of the signal generated and the distortion characteristics of the particular LVDT 12 or RVDT 72 being used. The sampled voltages held within sample and hold elements 38, 42 are transmitted through the multiplexer 58 to the digital converter 64 where the sampled voltages 48, 49 are converted to the digital numbers represented by A and B respectively. These digital representations of the sampled voltages A and B are then passed to the CPU 70. Within the CPU 70, the calculation for the position P is made, wherein P=(A−B)/(A+B). The values calculated for P are shown in the bottom line of FIG. 3 for each of the input unipolar square-wave pulses 92.

Returning again to the circuitry of FIG. 1, there is depicted a plurality of LVDTs 12(1−N), all having their primary coils 22 connected in parallel, while all of the secondary coils 24 and 26 have associated sample and hold elements 38 and 42 connected to a common multiplexer 58. There are several unique advantages to this arrangement. First, only one electrical wire is required to traverse from the driver 30 to all of the primary coils 22 within each LVDT 12 (1−N). This alone accounts for a significant weight and volume savings for a given application such as an aircraft wing which may include from 10-30 LVDTs spaced throughout its length. Second, the CPU 70 can control the multiplexer 58 and direct the multiplexer 58 as to which sampled voltages (A, B) from any one or any number of LVDTs 12 should be processed. This arrangement allows the sampling rates for various of the individual LVDTs 12 to be tailored to the particular application, or to isolate one LVDT for troubleshooting or testing. Additionally, the circuit of FIG. 1 may include a switch 102 and a one shot signal generator 104 as well as electrical conductors 106, 108, to allow the CPU 70 to be switched into electrical contact with line driver 30 (switching oscillator 28 out of contact) thus allowing the CPU 70 to control the frequency and shape of the voltage pulse delivered to the primary coils 22. For many applications involving a large number of LVDTs 12 or RVDTs 72 or any combination of the two, the circuitry of the present invention enhances the flexibility of the system while reducing the associated system complexity, weight, and bulk.

It should be evident from the foregoing description that the present invention provides many advantages over conventional AC excited position transducers. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

What is claimed is:

1. Position transducer apparatus for indicating the position of a movable element coupled to a variable differential transformer comprising:
   primary coil means for receiving an electric voltage pulse and for generating therefrom a magnetic field;
   at least two secondary coil means for producing at least two secondary waveforms in response to said magnetic field;
   displaceable core means attached to said movable element for magnetically linking said primary coil means and said secondary coil means and for causing attenuation in said secondary waveforms in proportion to the displacement thereof;
   means including a delayed pulse generator operatively connected to receive said electric voltage pulse for sampling a substantially distortion-free portion of said secondary waveforms and retaining sample values representative thereof; and
   means for computing a value representing the position of said movable element from said sample values.

2. The apparatus of claim 1 wherein said sample values are represented by A and B, and said value representing the position of said moveable core means is P within the calculation:

P=(A−B)/(A+B)

said calculation being performed within said means for computing.

3. The apparatus of claim 1 further comprising:
   means for converting said sample values from analog signals to digital signals prior to computing said position value.

4. The apparatus of claim 1 wherein said variable differential transformer is a linear variable displacement transducer.

5. The apparatus of claim 1 wherein said variable differential transformer is a rotational variable displacement transducer.

6. The apparatus of claim 1 further comprising:
   an analog to digital converter for sensing the sampled voltage values and generating digital representations thereof; and
   means for comparing said digital representations of said sampled voltage values to determine the position of said movable element.

7. The apparatus of claim 1 wherein said means for sampling is operable to sample the voltage across said secondary coils after said signal pulse energizes said secondary coils but before the de-energization of said secondary coils within the substantially distortion free portion of said output voltage waveform.

8. The apparatus of claim 1 wherein said primary coil receives said signal pulses at a rate of from five hundred hertz to four thousand hertz.

9. A transducer circuit comprising:
   means for producing an input signal pulse;
   at least one variable displacement transformer having one primary coil receiving said input signal pulse, two secondary coils, and a movable core whose movement inductively links said primary coil to said secondary coils in relation to the positon of said movable core;
   sample and hold elements each being individually connected to one of said secondary coils to measure and retain a voltage generated across said secondary coils in lagging synchronization with the production of said input signal pulse,
   and means comparing said retained voltages to determine a voltage representing the position of said movable core.

10. The transducer of claim 9 further comprising:
    an analog to digital converter to detect and digitize each of said retained voltage values of said sample and hold elements.

11. The transducer of claim 10 further comprising:
    a multiplexer for selectively connecting said analog to digital converter to said sample and hold elements.

12. The transducer of claim 10 further comprising:
    a digital computer connected to said analog to digital converter to read said digitized voltage values and calculate a position value P, between −1 and +1, to indicate the position of said moveable core of said at least one variable displacement transformer, according to the following formula:

P=(A−B)/(A+B)

wherein A is the digitized value representing the retained voltage of one of said secondary coils, and B is the digitized value representing the retained voltage of the other of said secondary coils.

13. The transducer of claim 9 further comprising:
    analog means for producing from said voltages retained within said sample and hold elements a signal indicative of the position of said moveable core.

14. The transducer circuit of claim 9 wherein said sample and hold elements are activated to sample said voltages of said secondary coils at a point in time lagging the initiation of said signal pulse and preceeding the end of said signal pulse.

15. A transducer comprising:
    a signal pulse generator for outputting a plurality of voltage pulses;

timing means associated with said signal pulse generator and synchronized with said plurality of voltage pulses;

a variable inductance transformer having a primary coil connected to said signal pulse generator, said variable inductance transformer also having a first secondary coil and a second secondary coil, said first secondary coil axially displaced with respect to said second secondary coil, said first and second secondary coils each having an output terminal and a grounded terminal, said first and second secondary coils generating a voltage across their respective terminals in response to said direct current pulse within said primary coil;

a movable magnetic flux coupling member inductively linking said primary coil and said first and second secondary coils, the position of said movable magnetic flux coupling member determining the amount of said inductive linkage;

a first sample and hold element connected to the output terminal of said first secondary coil, and a second sample and hold element connected to the output terminal of said second secondary coil, both said first and said second sample and hold elements also connected to said timing means for controlling the activation of said first and said second sample and hold elements, said first and said second sample and holds elements enabled to sample said voltages of said first and second secondary coils approximately intermediate the beginning and end of each of said direct current pulses.

16. The transducer of claim 15 further comprising:
means for comparing said voltage of said first sample and hold element represented by A, and said voltage of said second sample and hold element, represented by B, and for generating a signal equivalent to (A−B)/A+B) indicative of the position of said moveable magnetic flux coupling member.

17. The transducer of claim 15 further comprising:

an analog to digital converter connected to said first and said second sample and hold elements to measure said voltage of said first sample and hold element and to produce a corresponding first digital value, and to measure said voltage of said second sample and hold element and to produce a corresponding second digital value; and a digital computing device connected to said converter to receive said first and second digital values and to calculate a position value equivalent to the sum of said first and second digital values divided into the difference produced by subtracting said second digital value from said first digital value.

18. A process for measuring displacement of a core within a variable displacement core transformer comprising the steps of:

providing repetitive electrical pulses into a primary winding of a variable displacement core transformer having a pair of secondary windings;

measuring voltage waveforms produced in said pair of secondary windings in response to said electrical pulses at a linear segment of said voltage waveforms;

digitizing the magnitude of said pair of measured voltage waveform segments; and computing a quantity equivalent to the difference in said digitized magnitudes of said pair of measured voltage waveform segments divided by the sum of said digitized magnitudes, said quantity representing the displacement of said core.

19. The process of claim 18 wherein said measuring step lags said providing step by one half the duration of an electrical pulse.

20. The process of claim 18 wherein said electrical pulses in said primary winding and said measuring of said voltage waveforms in said pair of secondary windings occurs at a frequency of from five hundred hertz to four thousand hertz.

* * * * *